(12) United States Patent
Jung et al.

(10) Patent No.: US 10,866,427 B2
(45) Date of Patent: Dec. 15, 2020

(54) METHOD AND APPARATUS FOR OUTPUTTING POSE INFORMATION

(71) Applicant: Samsung Electronics Co., Ltd., Suwon-si (KR)

(72) Inventors: Hwiryong Jung, Seoul (KR); Chul Woo Kang, Suwon-si (KR); Hyewon Moon, Seongnam-si (KR); Kyungboo Jung, Seoul (KR); Sunghoon Hong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/283,898

(22) Filed: Feb. 25, 2019

(65) Prior Publication Data

US 2020/0103664 A1    Apr. 2, 2020

(30) Foreign Application Priority Data

Oct. 1, 2018    (KR) .................. 10-2018-0116785

(51) Int. Cl.
   *G06T 7/73* (2017.01)
   *G02B 27/01* (2006.01)
   *B60R 1/00* (2006.01)

(52) U.S. Cl.
   CPC ............ *G02B 27/0179* (2013.01); *B60R 1/00* (2013.01); *G02B 27/0101* (2013.01); *G06T 7/73* (2017.01);
   (Continued)

(58) Field of Classification Search
   None
   See application file for complete search history.

(56) References Cited

U.S. PATENT DOCUMENTS 6,037,988 A * 3/2000 Gu .................. H04N 19/56
                                                            375/240.16
6,307,959 B1 * 10/2001 Mandelbaum ............ G06T 7/55
                                                            382/104

(Continued)

FOREIGN PATENT DOCUMENTS

KR    10-2012-006819 A    1/2012
KR    10-1220527 B1       1/2013
WO    WO 2018/064141 A1   4/2018

OTHER PUBLICATIONS

Yousif, Khalid et al., "An Overview to Visual Odometry and Visual SLAM: Applications to Mobile Robotics", *Intelligent Industrial Systems*, vol. 1, Issue 4, Dec. 2015 (pp. 289-311).

(Continued)

*Primary Examiner* — Sultana M Zalalee
(74) *Attorney, Agent, or Firm* — NSIP Law

(57) ABSTRACT

A method and apparatus for outputting pose information selects first points from a frames captured by a first sensor, estimates rotation information between the frames based on motion information sensed by a second sensor, corrects the estimated rotation information based on third points, the third points being remaining points when second points corresponding to a dynamic object are excluded from the first points, obtains translation information between the frames based on the third points and the corrected rotation information, and outputs the corrected rotation information and the translation information.

20 Claims, 13 Drawing Sheets

(52) U.S. Cl.
CPC ..... *B60R 2300/205* (2013.01); *B60R 2300/30* (2013.01); *G02B 2027/014* (2013.01); *G02B 2027/0138* (2013.01); *G02B 2027/0141* (2013.01); *G02B 2027/0183* (2013.01); *G06T 2207/20021* (2013.01); *G06T 2207/30248* (2013.01)

(56) References Cited

U.S. PATENT DOCUMENTS

| | | | |
|---|---|---|---|
| 6,707,854 B1* | 3/2004 | Bonnet | H04N 19/54 375/240.16 |
| 7,831,094 B2 | 11/2010 | Gupta et al. | |
| 8,594,374 B1 | 11/2013 | Bozarth | |
| 9,459,692 B1* | 10/2016 | Li | G06F 3/012 |
| 2003/0218672 A1 | 11/2003 | Zhang et al. | |
| 2004/0174496 A1 | 9/2004 | Ji et al. | |
| 2011/0012896 A1 | 1/2011 | Ji | |
| 2011/0243390 A1* | 10/2011 | Eggert | G06T 7/269 382/107 |
| 2012/0308114 A1* | 12/2012 | Othmezouri | G06T 7/285 382/154 |
| 2013/0169822 A1* | 7/2013 | Zhu | G06T 7/80 348/180 |
| 2014/0191946 A1 | 7/2014 | Cho et al. | |
| 2015/0138322 A1* | 5/2015 | Kawamura | G06T 7/73 348/46 |
| 2015/0235378 A1 | 8/2015 | Rhee et al. | |
| 2015/0294505 A1* | 10/2015 | Atsmon | G06F 3/04815 345/633 |
| 2015/0369609 A1 | 12/2015 | Roumeliotis et al. | |
| 2016/0068114 A1* | 3/2016 | Liao | G06T 7/73 348/148 |
| 2016/0140729 A1* | 5/2016 | Soatto | G01S 5/16 348/135 |
| 2016/0364867 A1 | 12/2016 | Moteki et al. | |
| 2017/0004379 A1* | 1/2017 | Ramalingam | G06K 9/00791 |
| 2017/0206674 A1* | 7/2017 | Westerhoff | G06T 7/97 |
| 2017/0345164 A1* | 11/2017 | Guerreiro | G06T 7/246 |
| 2018/0031387 A1* | 2/2018 | Scherer | G06T 7/579 |
| 2018/0053056 A1* | 2/2018 | Rabinovich | G06F 3/0338 |
| 2018/0058879 A1* | 3/2018 | Tayama | B60W 30/16 |
| 2018/0101178 A1* | 4/2018 | Yoon | G06K 9/00791 |
| 2018/0268237 A1* | 9/2018 | Stanimirovic | G06K 9/2018 |
| 2018/0330521 A1* | 11/2018 | Samples | A63F 13/213 |
| 2019/0121361 A1* | 4/2019 | Afrouzi | G05D 1/0088 |
| 2019/0162842 A1* | 5/2019 | Niesen | G01S 13/72 |

OTHER PUBLICATIONS

Extended European Search Report dated Oct. 23, 2019 in counterpart European Application No. 19166616.3 (9 pages in English).
Klein, George et al., "Parallel Tracking and Mapping for Small AR Workspaces", *2007 6th IEEE and ACM International Symposium on Mixed and Augmented Reality*, Nov. 13-16, 2007 (10 pages in English).
Tsai, F., et al., "Combining MEMS-Based IMU Data and Vision-Based Trajectory Estimation." *ISPRS Annals of Photogrammetry, Remote Sensing & Spatial Information Sciences*, Mar. 2014 (5 pages in English).
Engel, Jakob, et al., "LSD-SLAM: Large-Scale Direct Monocular SLAM", *European conference on computer vision*, Sep. 2014 (16 pages in English).
Mur-Artal, Raul, et al., "ORB-SLAM: a Versatile and Accurate Monocular SLAM System", *IEEE Transactions on Robotics*, vol. 31, Issue 5, Aug. 24, 2015 (pp. 1147-1163).
Rahman, Muhammed Tahsin, et al. "Improving Multisensor Positioning of Land Vehicles with Integrated Visual Odometry for Next-Generation Self-Driving Cars", *Journal of Advanced Transportation*, vol. 2018, Mar. 26, 2018 (13 pages in English).
Gakne, Paul, et al., "Tightly-Coupled GNSS/Vision Using a Sky-Pointing Camera for Vehicle Navigation in Urban Areas", *Sensors*, 18.4, Apr. 17, 2018 (32 pages in English).

* cited by examiner

140

METHOD AND APPARATUS FOR OUTPUTTING POSE INFORMATION

CROSS-REFERENCE TO RELATED APPLICATIONS

This application claims the benefit under 35 USC § 119(a) of Korean Patent Application No. 10-2018-0116785 filed on Oct. 1, 2018 in the Korean Intellectual Property Office, the entire disclosure of which is incorporated herein by reference for all purposes.

BACKGROUND

1. Field

The following description relates to a method and an apparatus for outputting pose information based on a visual inertial odometry (VIO).

2. Description of Related Art

An image-based positioning method may include various methods, such as, for example, structure from motion (SfM), simultaneous localization and mapping (SLAM), and visual odometry (VO). The positioning methods may perform positioning by calculate a depth value of each pixel in a photographed image and a position of a camera photographing the image using homography. Homography may represent a relationship between pixels of consecutive images acquired by the camera. However, in the positioning method, an accuracy may be reduced due to degradation in tracking performance and/or a tracking loss that occurs when tracking a movement of a moving object. A lot of resources may be consumed in repetitively selecting and/or removing an area to be an outlier when selecting feature points from images, i.e., an area corresponding to the moving object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of obtaining pose information, the method including selecting first points from frames captured by a first sensor, estimating rotation information between the frames based on motion information sensed by a second sensor, correcting the estimated rotation information based on third points, the third points being remaining points when second points corresponding to a dynamic object are excluded from the first points, obtaining translation information between the frames based on the third points and the corrected rotation information, and outputting the corrected rotation information and the translation information.

The rotation information may include estimating states of an ego-motion corresponding to the frames based on the motion information, and estimating rotation information between the frames based on the estimated states.

The estimating of the states may include estimating a state of a second time point based on a state of a first time point and motion information of the second time point.

The states of the ego-motion may include a first state for estimating the rotation information and a second state for estimating the translation information.

The estimating of the rotation information may include estimating the rotation information of the frames using one of a Kalman filter, an extended Kalman filter, an iterated extended Kalman filter, an unscented Kalman filter, or a particle filter.

The second points may be identified based on the rotation information.

The correcting of the estimated rotation information may include removing the second points corresponding to the dynamic object from among the first points based on the estimated rotation information, estimating rotation information between the frames based on the third points, and correcting the rotation information estimated based on the motion information using the rotation information estimated based on the third points.

The frames may include a first frame captured at a first time and a second frame captured at a second time, and the removing of the second points may include calculating a rotation change amount between first rotation information estimated at the first time and second rotation information estimated at the second time, and removing second points corresponding to a dynamic object from among the first points based on the rotation change amount.

The estimating of the rotation information based on the third points may include estimating the rotation information by applying one of a Perspective-n-Point (PNP) function, a Gauss-Newton optimization function, or a Levenberg-Marquardt optimization function to the third points.

The method of claim 7, wherein the correcting of the estimated rotation information may include updating a state of an ego-motion corresponding to any one or any combination of the frames based on a difference between the rotation information estimated based on the third points and the rotation information estimated based on the motion information.

The obtaining of the translation information may include determining the translation information based on the corrected rotation information such that an energy function associated with a difference in intensity between frames to which the third points belong may be less than a threshold.

The energy function may include one of a Gauss-Newton optimization function or a Levenberg-Marquardt optimization function.

The selecting of the first points may include at least one of selecting the first points for each block into which the frames are divided, or selecting the first points for each class in the frames.

The selecting the first points for each block may include equally dividing each of the frames into blocks, and selecting the first points from each of the equally divided blocks.

The selecting of the first points for each class may include determining candidate points corresponding to classes based on at least one of degrees of intensity gradients of pixels in each of the frames, directions of the intensity gradients of the pixels, or intensity relationships between the pixels and adjacent pixels, and selecting the first points from the candidate points in the each of the classes.

The selecting of the first points may include assigning a first weight to points on a center of each of the frames, assigning a second weight to the points away from the center and toward an outer edge of each of the frames, and selecting the first points from the points based on the first weight and the second weight.

In another general aspect, there is provided an apparatus for outputting pose information, the apparatus including a first sensor configured to capture frames, a second sensor configured to sense motion information, and a processor configured to estimate rotation information between the frames based on the motion information, to correct the estimated rotation information based on third points, the third points being remaining points when second points corresponding to a dynamic object are excluded from the first points, and to obtain translation information between the frames based on the third points and the corrected rotation information.

The processor may be configured to estimate states of an ego-motion corresponding to the frames based on the motion information and to estimate rotation information between the frames based on the estimated states.

The processor may be configured to remove the second points corresponding to the dynamic object from among the first points based on the estimated rotation information, to estimate rotation information between the frames based on the third points, and to correct the rotation information estimated based on the motion information using the rotation information estimated based on the third points.

The processor may be configured to determine the translation information based on the corrected rotation information such that an energy function associated with a difference in intensity between a frames to which the third points belong may be less than a threshold.

Each of the frames may include an image of a front view from a vehicle.

In another general aspect, there is provided a pose detection apparatus including a first sensor configured to capture image frames, a second sensor configured to sense motion information, a head-up display (HUD), and a processor configured to select first points from the image frames, estimate rotation information between the image frames based on the motion information, adjust the rotation information based on third points, the third points being remaining points when second points corresponding to a dynamic object are excluded from the first points, obtain translation information between the image frames based on the third points and the adjusted rotation information, and render a virtual object on the HUD based on the corrected rotation information and the translation information.

The device may include a memory storing the image frames, the motion information, the rotation information, the corrected rotation information, the translation information, and instructions that, when executed, configures the processor to determine any one or any combination of the rotation information and the translation information.

Other features and aspects will be apparent from the following detailed description, the drawings, and the claims.

Figure 1:
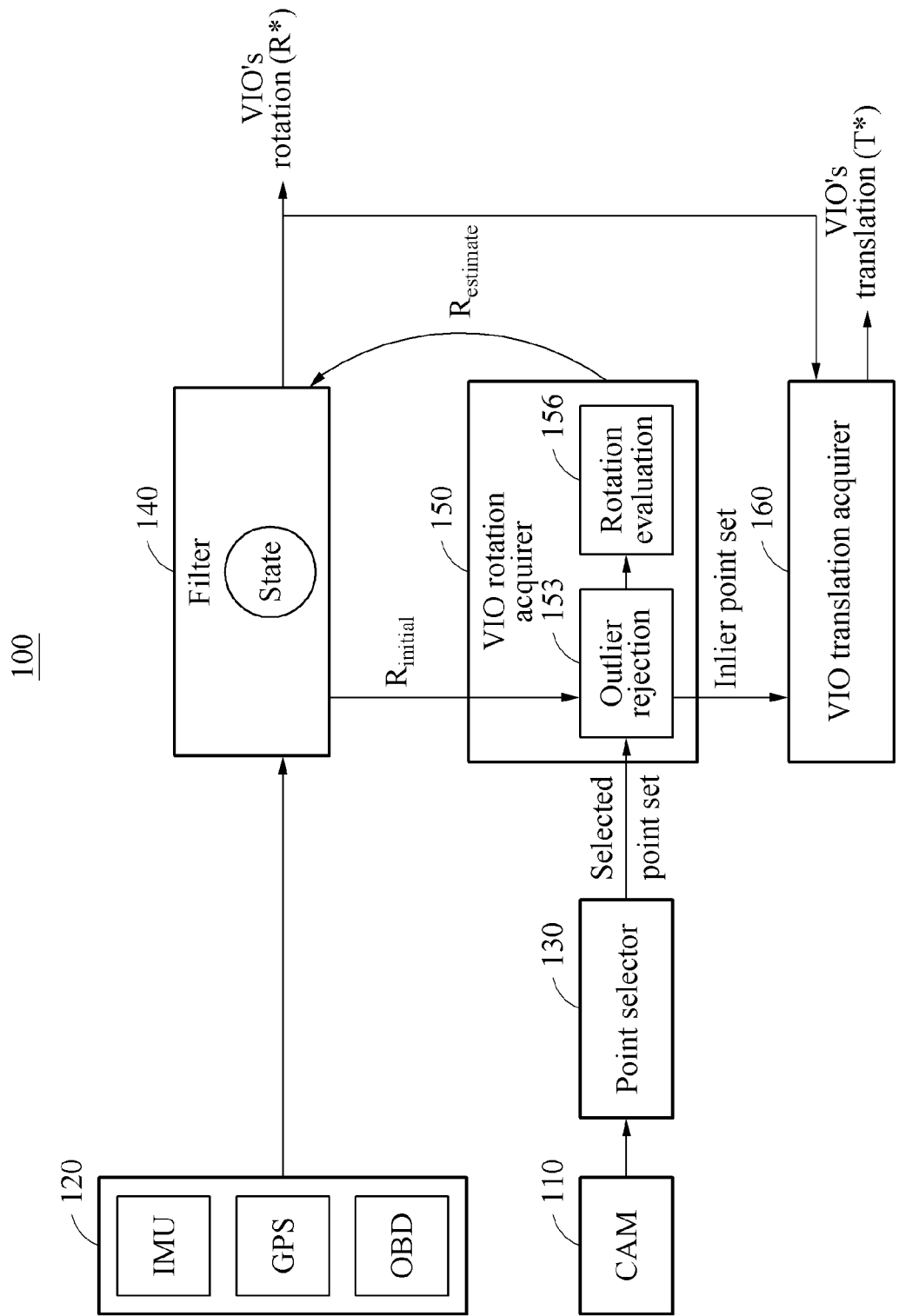
FIG. 1 illustrates an example of a process of outputting pose information.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

If the specification states that one component is "connected," "coupled," or "joined" to a second component, the first component may be directly "connected," "coupled," or "joined" to the second component, or a third component may be "connected," "coupled," or "joined" between the first component and the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

When a part is connected to another part, it includes not only a case where the part is directly connected but also a case where the part is connected with another part in between. Also, when a part includes a constituent element, other elements may also be included in the part, instead of the other elements being excluded, unless specifically stated otherwise. Although terms such as "first," "second," "third" "A," "B," (a), and (b) may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Hereinafter, the examples will be described in detail with reference to the accompanying drawings, wherein like drawing reference numerals are used for like elements.

FIG. 1 is a diagram illustrating an example of a process of outputting pose information using an outputting apparatus. FIG. 1 illustrates a configuration and an operation of an apparatus 100 for outputting pose information based on a visual inertial odometry (VIO) (hereinafter, referred to as "outputting apparatus"). Pose information includes any one or any combination of rotation information associated with a rotation of the outputting apparatus, translation information associated with a translation of the outputting apparatus.

In general, a visual odometry estimates pose information using a visual function. However, when a dynamic object is present in an image, the pose information may not be accurately estimated because it is difficult to distinguish whether a camera is moving or an ambient object is moving using only information in an image that is captured by the camera. Also, it may be difficult to estimate a sudden movement using visual odometry. In contrast, an inertial measurement device such as an inertial measurement unit (IMU) sensor detects such sudden movement, but may not be suitable for continuous detection of a motion over long time intervals due to a characteristic of error accumulation.

Accordingly, the pose information may be more accurately calculated by distinguishing between a motion of the camera (or a motion of a static object in an image due to the motion of the camera) and a motion of the dynamic object using the information on the image captured by the camera together with motion information sensed by the inertial measurement device. The inertial measurement device provides the motion information irrespective of the image, and thus, may increase accuracy and an operation speed of the pose information by using the motion information and the information on the image.

Figure 10:
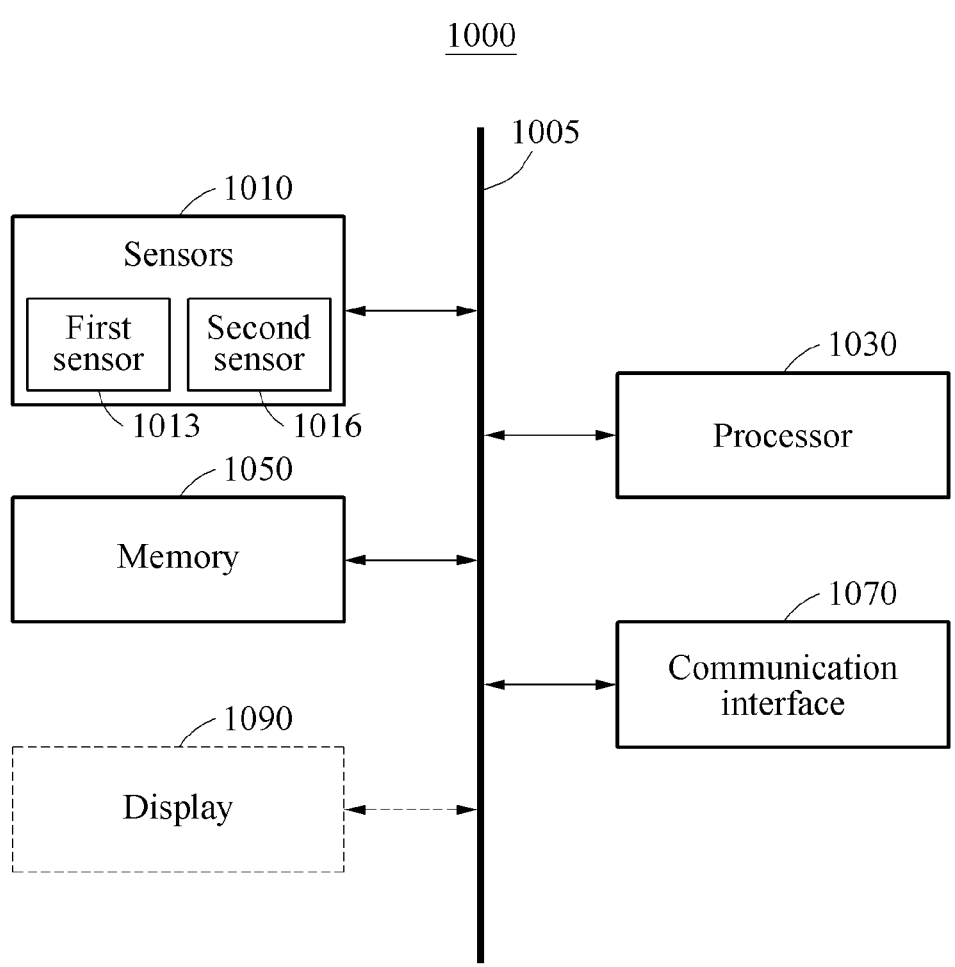
FIG. 10 illustrates an example of an apparatus for outputting pose information.

In an example, the outputting apparatus 100 includes a first sensor 110, a second sensor 120, a filter 140, a point selector 130, a rotation information acquirer, for example, a VIO rotation acquirer 150, and a translation information acquirer, for example, a VIO translation acquirer 160. Here, operations of the filter 140, the point selector 130, the VIO rotation acquirer 150, and the VIO translation acquirer 160 are performed by a processor of the outputting apparatus 100. Further details on the processor, such as, for example, processor 1030 of FIG. 10, is provided below.

The outputting apparatus 100 outputs pose information by calculating an amount of change in 6-degree-of-freedom (DOF) pose between image frames based on a VIO. In an example, the 6DoF pose includes three-dimensional (3D) translation information T and 3D rotation (orientation) information R. The translation information T may be understood as a positional change and the rotation information R may be understood as an orientation change.

The first sensor 110 captures a plurality of image frames. The first sensor 110 is, for example, a camera, an image sensor, or a vision sensor. In an example, the first sensor 110 is attached to various positions on a vehicle, such as, for example, a windshield, a dashboard, and a rear-view mirror. The first sensor captures a driving image of a front view of the vehicle. For example, the first sensor 110 captures a first frame at a first time point and captures another frame at an $n^{th}$ time point.

The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, a smart mobility device, or a drone. In an example, the smart mobility device includes mobility devices such as, for example, electric wheels, electric kickboard, and electric bike. In an example, vehicles include motorized and non-motorized vehicles, for example, a vehicle with a power engine (for example, a cultivator or a motorcycle), a bicycle or a handcart.

In addition to the vehicle described herein, methods and apparatuses described herein may be included in various other devices, such as, for example, a smart phone, a walking assistance device, a wearable device, a security device, a robot, a mobile terminal, and various Internet of Things (IoT) devices.

The second sensor 120 senses motion information. The second sensor 120 may be a single sensor or a plurality of sensors. The second sensor 120 includes, for example, an IMU sensor, a global positioning system (GPS) sensor, and an on-board diagnostics (OBD). The second sensor 120 senses first motion information at a first time point, senses second motion information at a second time point, and senses third motion information at an $n^{th}$ time point.

The point selector 130 selects an area to be used for calculating the pose information from the frame captured by the first sensor 110. For example, the point selector 130 selects points (for example, first points) corresponding to a calculation area of a VIO from the frames.

The point selector 130 selects the points based on various methods. In one example, the point selector 130 selects the points evenly in an area of the plurality of frames. In another example, the point selector 130 selects the point for each of various classes such as a blob, an edge, and a corner included in the plurality of frames. In another example, the point selector 130 selects a smaller number of points from a center of the image toward a boundary (an outer edge) than the center of the image because of error occurring when restoring an image that is distorted due to a lens of a camera capturing frames. An operation of the point selector 130 will be further described with reference to FIGS. 7 through 8D.

The filter 140 estimates states of an ego-motion corresponding to the plurality of frames based on the motion information sensed by the second sensor 120. The ego-motion may be a 3D motion of a device in an environment and includes, for example, an orientation motion and a translation motion of the outputting apparatus. The filter 140 estimates a state of the ego-motion based on the motion information, which in an example of an observed value or a measurement. The filter 140 outputs information on the ego-motion based on the estimated state. For example, the filter 140 estimates rotation information $R_{initial}$ between the plurality of frames based on the estimated states. In an example, the filter 140 transmits the rotation information $R_{initial}$ to the VIO rotation acquirer 150.

In an example, a time point at which the first sensor 110 captures the plurality of image frames is not synchronized with a time point at which the second sensor 120 senses the motion information. For example, an interval between time points when the first sensor 110 captures the plurality of image frames may be greater than an interval between time points when the second sensor 120 senses the motion information.

The filter 140 selects time points corresponding to time points at which the first sensor 110 captures the plurality of frames from a plurality of time points at which the second sensor 120 senses the motion information, thereby estimating and transmitting rotation information between the selected time points.

The filter 140 estimates, for example, a speed, an IMU bias (for example, an angular velocity and an acceleration), and an absolute position based on the motion information sensed by the second sensor 120. In an example, the motion information includes, for example, three-axis rotation information associated with pitch, roll, and yaw axes detected by a gyroscope of an IMU sensor, information on a movement in three axes, that is, forward/back, up/down, and left/right axes in a 3D space sensed by an accelerometer, a GPS position, an OBD wheel odometry, steering angle information, and pose information. An operation of the filter 140 will be described with reference to FIGS. 4A and 4B.

The VIO rotation acquirer 150 receives the rotation information $R_{initial}$ from the filter 140. In an example, the VIO rotation acquirer 150 excludes second points corresponding to an outlier from the first points selected by the point selector 130 based on the rotation information $R_{initial}$. In an example, the VIO rotation acquirer 150 estimates rotation information $R_{estimate}$ based on third points obtained by excluding the second points from the first points. The VIO rotation acquirer 150 transmits the estimated rotation information $R_{estimate}$ to the filter 140. In an example, the second points corresponding to the outlier may be points corresponding to a dynamic object.

Hereinafter, the "first points" are points selected from an area for calculating pose information in frames captured by the first sensor 110. The "second points" are points corresponding to a dynamic object from among the first points, for example, points to be removed to recognize a motion of a static object included in the frames. The second points may also be referred to as an "outlier" because the second points are removed for calculation of the pose information. The "third points" are points that remain after the second points are removed from the first points, for example, points corresponding to the static object. The third points may also be referred to as an "inlier".

The VIO rotation acquirer 150 performs an outlier rejection 153 and a rotation evaluation 156.

In outlier rejection 153, the VIO rotation acquirer 150 rejects the outlier (the second points corresponding to the dynamic object) from the first points based on the rotation information $R_{initial}$ estimated based on the motion information received from the filter 140.

In rotation evaluation 156, the VIO rotation acquirer 150 estimates the rotation information $R_{estimate}$ between the plurality of frames based on the third points transferred through the outlier rejection 153. In an example, to evaluate (or estimate) rotation information based on visual information, the VIO rotation acquirer 150 directly uses a pixel intensity of a point in an image. Although directly using the pixel intensity of the point in the image is described in the present examples, other methods to evaluate (or estimate) rotation information based on visual information, such as, for example using a feature extracted from an image, may be used without departing from the spirit and scope of the illustrative examples described.

The VIO rotation acquirer 150 transfers, to the filter 140, the rotation information $R_{estimate}$ estimated based on the third points. An operation of the VIO rotation acquirer 150 will be further described with reference to FIG. 5B.

The filter 140 receives the rotation information $R_{estimate}$ from the VIO rotation acquirer 150. The filter 140 corrects the rotation information $R_{initial}$ based on the rotation information $R_{estimate}$ and outputs rotation information R*. For example, when the rotation information $R_{estimate}$ estimated based on the third points is received from the VIO rotation acquirer 150, the filter 140 updates the state of the ego-motion based on a difference between the rotation information $R_{estimate}$ and the rotation information $R_{initial}$ estimated based on the motion information. The filter 140 outputs the rotation information R* based on the updated state. The rotation information may be expressed in a form of, for example, a quaternion or a matrix.

In an example, an operation of the filter 140 to estimate the rotation information $R_{initial}$ based on the second sensor 120 is distinguished from an operation of the VIO rotation acquirer 150 to estimate the rotation information $R_{estimate}$ based on the first sensor 110. Thus, the example illustrated in FIG. 1 provides a characteristic of a loosely-coupled system where the processing of inertial information and the processing of visual information are loosely-coupled to each other.

In an example, the rotation information $R_{initial}$ is used to select points for estimating the rotation information $R_{estimate}$ and the rotation information $R_{estimate}$ is used to correct the rotation information $R_{initial}$, whereby the rotation information R* is output. Thus, the example illustrated in FIG. 1 provides a characteristic of a tightly-coupled system where the processing of inertial information and the processing of visual information are tightly-coupled to each other.

Accordingly, the examples provide advantages of both the loosely-coupled system and the tightly-coupled system. For example, an operation speed is improved by removing the second points, which is difficult to remove using only the image frames of the first sensor 110, in a dynamic object area based on state information of the second sensor 120 integrated through the filter 140. Also, a visual information-based estimation result is provided to an inertial information-based filter, so that the accuracy of the estimation is improved.

The VIO translation acquirer 160 calculates an amount of change in motion information. The VIO translation acquirer 160 calculates translation information T* between the plurality of frames based on the rotation information R* corrected in the filter and the third points. An operation of the VIO translation acquirer 160 will be further described with reference to FIG. 6.

The outputting apparatus 100 outputs the rotation information R* and the translation information T*.

Examples set forth hereinafter may be used to provide pose information, generate visual information to assist steering of an autonomous vehicle, or provide various control information for driving in an augmented reality (AR) navigation system of a smart vehicle. The examples may be used to provide visual information and assist safe and pleasant driving in a device including an intelligent system such as a head-up display (HUD) installed for driving assistance or fully autonomous driving of a vehicle. The examples may be applied to, for example, an autonomous vehicle, an intelligent vehicle, a smart phone, and a mobile device.

Figure 2:
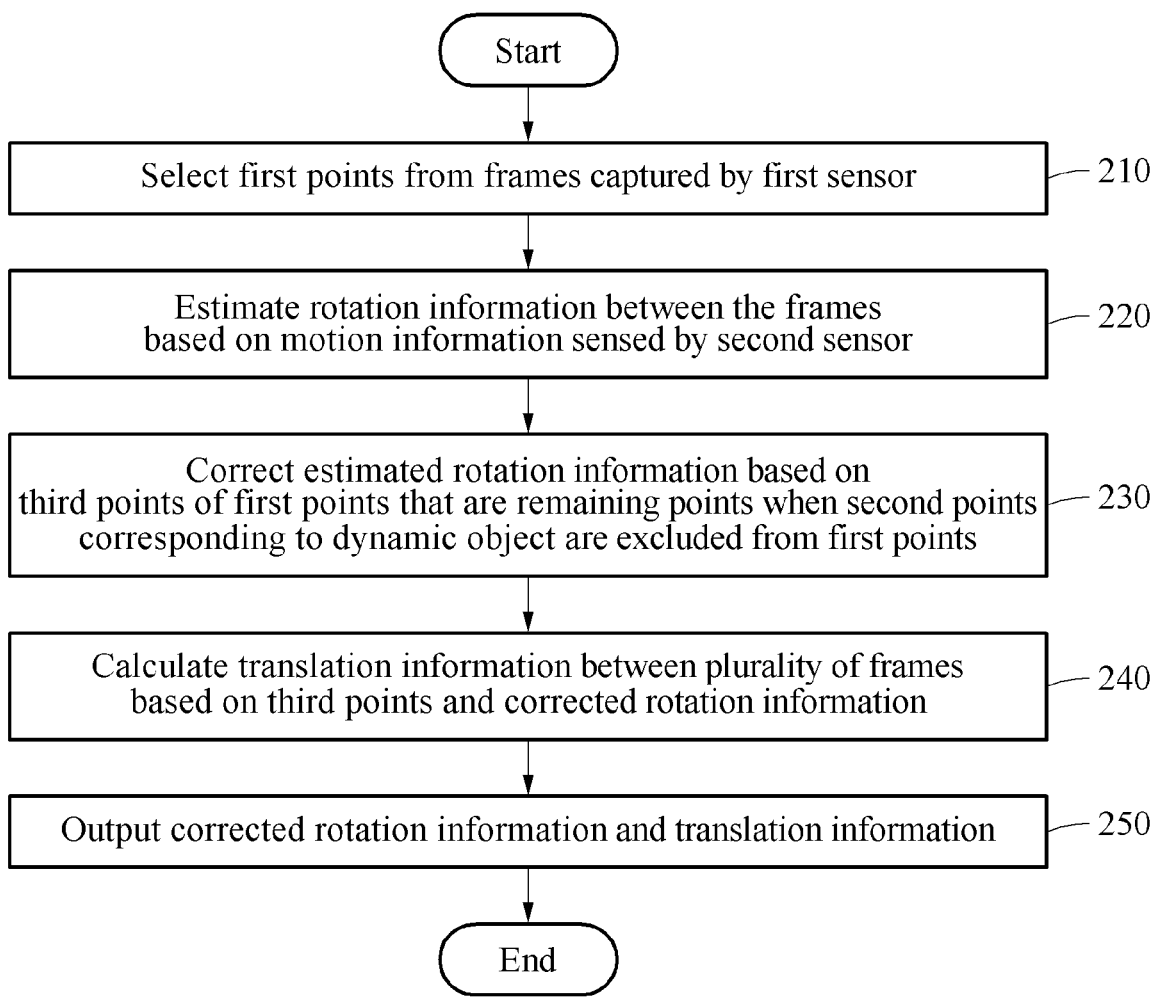
FIG. 2 illustrates an example of a method of outputting pose information.

FIG. 2 is a diagram illustrating an example of a method of outputting pose information. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, in operation 210, an apparatus for outputting pose information (hereinafter, referred to as "outputting apparatus") selects first points from frames captured by a first sensor. A method of selecting the first points using the outputting apparatus will be further described with reference to FIGS. 7 through 8D.

In operation 220, the outputting apparatus estimates rotation information between the frames based on motion information sensed by a second sensor. The outputting apparatus estimates the rotation information between the frames using, for example, a Kalman filter, an extended Kalman filter, an iterated extended Kalman filter, an unscented Kalman filter, and a particle filter. A method of estimating the rotation information between the plurality of frames using the outputting apparatus will be further described with reference to FIGS. 3 through 4B.

In operation 230, the outputting apparatus corrects the estimated rotation information based on third points. The third points are the remaining point in the first points when second points corresponding to a dynamic object is excluded. A method of correcting the estimated rotation information using the outputting apparatus will be further described with reference to FIGS. 5A and 5B.

In operation 240, the outputting apparatus calculates translation information between the frames based on the third points and the corrected rotation information. The outputting apparatus determines the translation information based on the corrected rotation information such that an energy function associated with a difference in intensity between the frames to which the third points belongs is less than a target value. The energy function includes functions, such as, for example, a Gauss-Newton optimization function that approximates a nonlinear function locally with a linear function to obtain a solution and a Levenberg-Marquardt optimization function that finds repeatedly optimized solutions starting from the initial solution when the initial solution is provided. In an example, the Gauss-Newton optimization function may obtain a solution using both the gradient and the curvature of a function. A process of calculating the motion information using the outputting apparatus will be further described with reference to FIG. 6.

In operation 250, the outputting apparatus outputs the rotation information corrected in operation 230 and the translation information calculated in operation 240.

Figure 3:
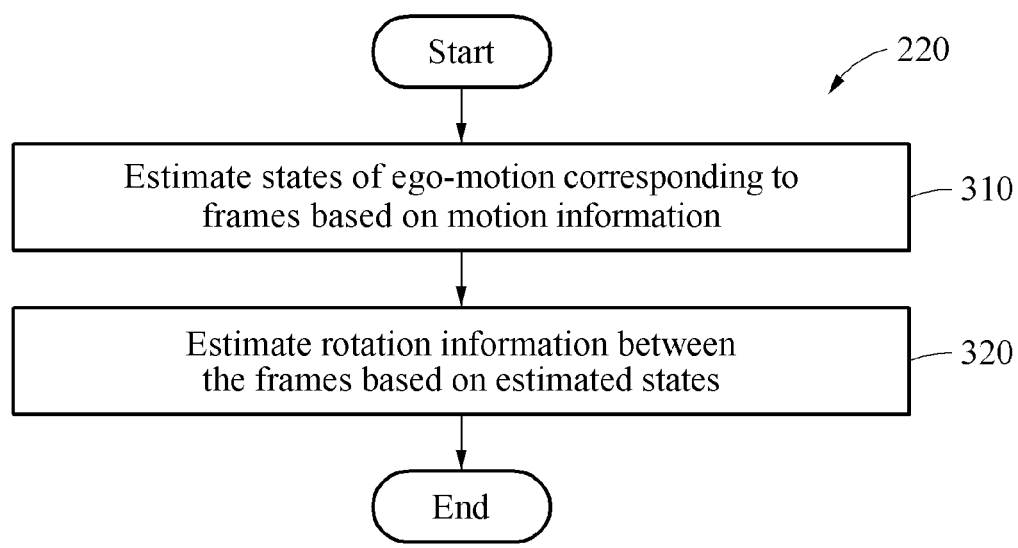
FIG. 3 illustrates an example of estimating rotation information between a plurality of frames.

FIG. 3 is a diagram illustrating an example of a method of estimating rotation information between a plurality of frames. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIG. 1-2 are also applicable to FIG. 3, and are incorporated herein by reference. Thus, the above description may not be repeated here.

Referring to FIG. 3, an outputting apparatus estimates states of an ego-motion corresponding to a plurality of frames based on motion information in operation 310. In an example, the outputting apparatus estimates a state of a second time point based on a state of a first time point and motion information of the second time point. In an example, the second time point corresponds to a current time point and the first time point corresponds to a previous time point. The states of the ego-motion include a first state for estimating rotation information and a second state for estimating translation information. In an example, the rotation information is estimated based on the first state and the translation information is estimated based on the second state.

In operation 320, the outputting apparatus estimates rotation information between the plurality of frames based on the states estimated in operation 310. A method of estimating the states of the ego-motion and estimating the rotation information between the plurality of frames using the filter 140 of the outputting apparatus will be further described with reference to FIGS. 4A and 4B.

Figure 4A:
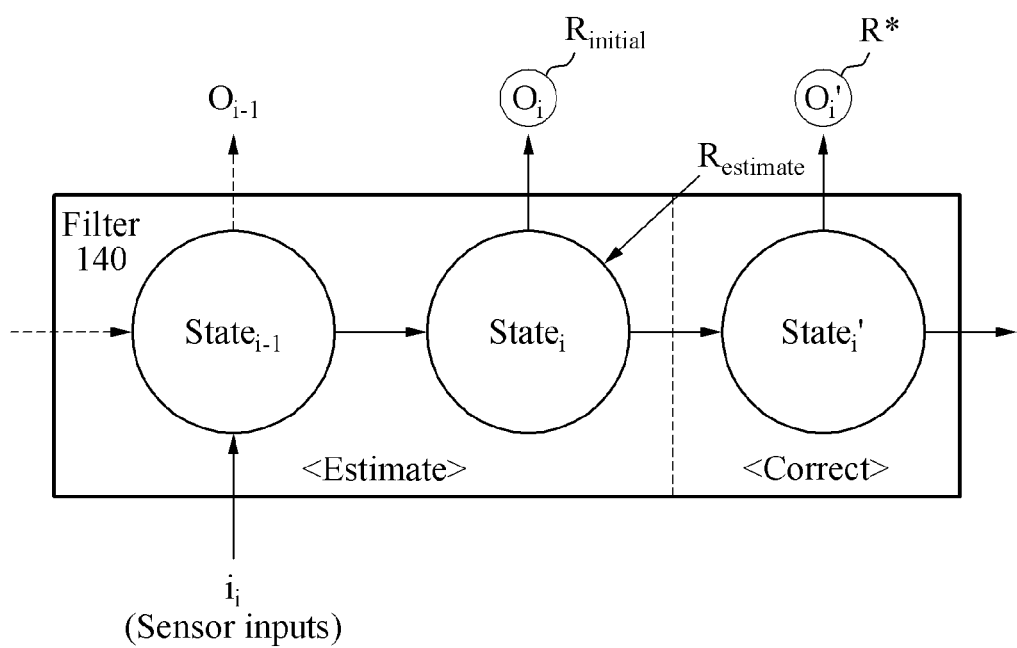
FIGS. 4A and 4B illustrate examples of a method of estimating rotation information between a plurality of frames.

FIG. 4A is a diagram illustrating an example of a method of estimating rotation information between a plurality of frames. FIG. 4A illustrates states ($State_{i-1}$, $State_i$, and $State_i'$) of an ego-motion estimated by the filter 140 based on a plurality of frames.

The filter 140 estimates states of an ego-motion corresponding to a plurality of frames based on sensor inputs $i_i$. Here, the sensor inputs $i_i$ may correspond to motion information sensed by the second sensor as described above.

In an example, the filter 140 estimates a state at a time point i ($State_i$) based on a state at a time point i−1 ($State_{i-1}$) and motion information ($i_i$) at the time point i. In an example, the filter 140 "estimates" rotation information $R_{initial}$ between a plurality of frames based on the estimated states (the state at the time point i−1 ($State_{i-1}$) and the state at the time point i ($State_i$)). The rotation information $R_{initial}$ is calculated as a rotation change amount $\Delta R$ between an output value of the state at the time point i−1 ($State_{i-1}$) and an output value of the state at the time point i ($State_i$). In an example, the state of the time point i−1 ($State_{i-1}$) corresponds to a time point at which a first frame is captured by the first sensor 110 and the state of the time point i ($State_i$) corresponds to a time point at which a second frame is captured by the first sensor 110.

The filter 140 receives rotation information $R_{estimate}$ estimated based on third points from the VIO rotation acquirer 150. In this example, the rotation information $R_{estimate}$ estimated based on the third points is used to correct the rotation information $R_{initial}$. The rotation information $R_{estimate}$ corresponds to, for example, a rotation change amount $\Delta R$ between the first frame captured at the time point i−1 and the second frame captured at the time point i.

The filter 140 "corrects" the rotation information $R_{initial}$ based on the rotation information $R_{estimate}$ and outputs rotation information $R^*$. The filter 140 updates the state of the ego-motion at the time point i ($State_i$) to be a state ($State_i'$) based on a difference between the rotation information $R_{estimate}$ estimated based on the third point and the rotation information $R_{initial}$ estimated based on motion information. The filter 140 outputs the rotation information R* based on the updated state (State$_i$'). For example, the rotation information R* is calculated as a rotation change amount ΔR between an output value $O_{i-1}$ of the state (State$_{i-1}$) and an output value $O_i'$ of the state (State$_i$').

Figure 4B:
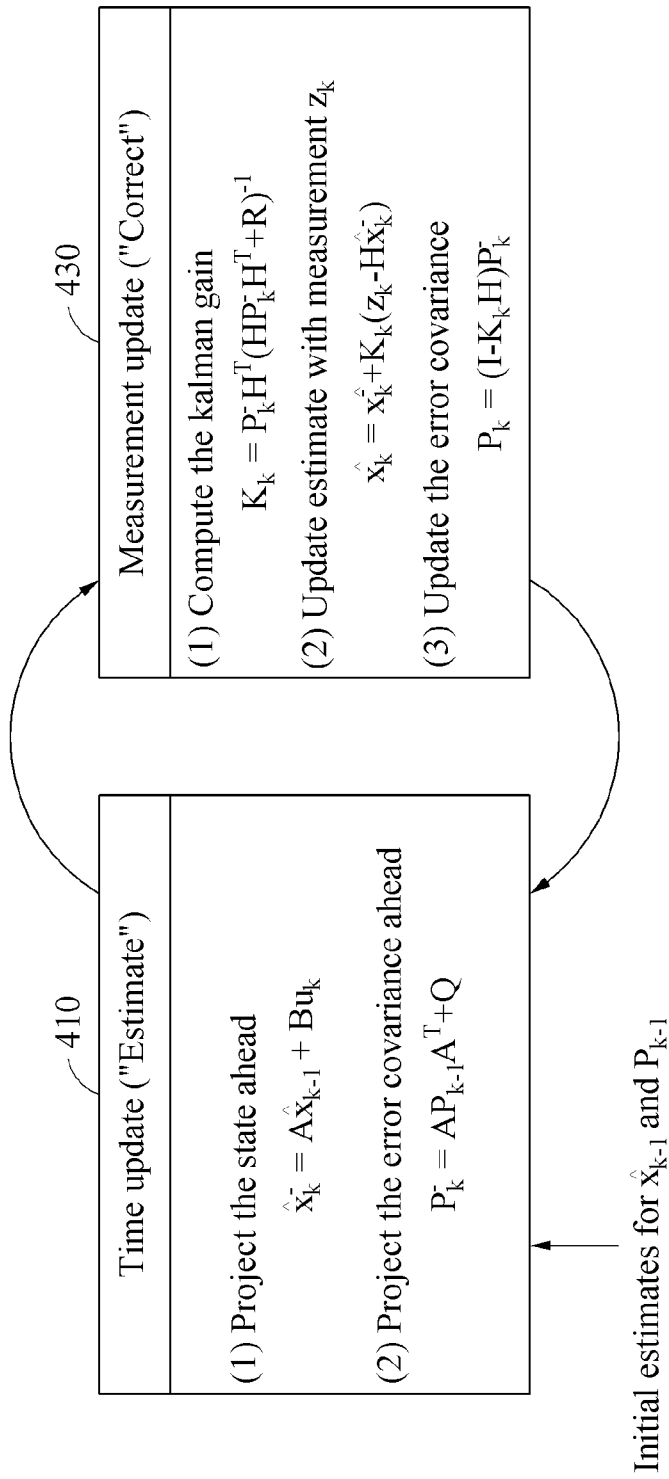

FIG. 4B is a diagram illustrates an example of a method of estimating rotation information in a Kalman filter. FIG. 4B illustrates an estimation process 410 of "estimating" rotation information $R_{initial}$ between a plurality of frames in the Kalman filter and a correction process 430 of correcting rotation information $R_{initial}$. Although an operation of the Kalman filter which is an example of the filter 140 is described for brevity of description, a type of filter is not limited thereto. In addition to the Kalman filter, various filters such as, for example, a particle filter may be used without departing from the spirit and scope of the illustrative examples described.

In the estimation process 410, an operation of the Kalman filter (hereinafter, referred to as "filter") is as follows.

The filter determines a current state $\hat{x}_k^-$ based on a previous state $\hat{x}_{k-1}$ and a current input $u_k$. The filter also calculates an error covariance $P_k^-$. In the estimation process 410, an output value $H\hat{x}_k^-$ is determined based on the current state $\hat{x}_k^-$. Since a state estimated in the filter is a hidden value, it is difficult to directly correct the state.

The filter corrects the state based on a difference between a measurement $z_k$ and the output value $H\hat{x}_k^-$ of the estimation process 410 through the correction process 430. In this example, a degree to which the state is corrected is determined using a Kalman gain $K_k$ based on the error variance $P_k^-$. The error variance $P_k^-$ is also updated to be $P_k$ based on the Kalman gain $K_k$.

The aforementioned process may be applied to the outputting apparatus in the example of FIG. 1 as follows.

An IMU sensor senses an angular velocity w and an acceleration corresponding to motion information. In this example, a state of an ego-motion of the filter may separately include a state r for estimating the rotation information $R_{initial}$ and a state t for estimating translation information $T_{initial}$.

When motion information ($w_1$, $a_1$) is sensed from the IMU sensor at a first time point, the filter updates the state r and the state t based on the motion information ($w_1$, $a_1$). The filter updates a state $r_0$ and a state to $t_0$ be a state $r_1$ and a state $t_1$ based on the motion information ($w_1$, $a_1$).

When motion information ($w_2$, $a_2$) is sensed from the IMU sensor at a second time point, the filter updates the state $r_1$ and the state $t_1$ to be a state $r_2$ and a state $t_2$ based on the motion information ($w_2$, $a_2$).

Likewise, when motion information ($w_n$, $a_n$) is sensed from the IMU sensor at an $n^{th}$ time point, the filter updates a state $r_{n-1}$ and a state $t_{n-1}$ to be a state $r_n$ and a state $t_n$ based on the motion information ($w_n$, $a_n$). At an initial time point (a zeroth time point) at which an operation of the IMU starts, rotation information R and translation information T are initialized (for example, set to be zero). Since an amount of change between rotation information estimated at each time point and an amount of change between translation information estimated at each time point are used, an initialization value may not affect a subsequent operation.

Also, it is assumed that a camera captures a first frame at the first time point and captures a second frame at the $n^{th}$ time point. In this example, the filter calculates a change amount O between an output value $O_1$ corresponding to the state $r_1$ of the first time point and an output value $O_n$ corresponding to the state $r_n$ of the $n^{th}$ time point and outputs $R_{initial}$.

The outputting apparatus rejects an outlier corresponding to a dynamic object in image information using $R_{initial}$ and calculates $R_{estimate}$ by applying a Perspective-n-Point (PNP) function to points (third points) obtained by rejecting the outlier. $R_{estimate}$ may be fed back as a measurement of the filter.

The outputting apparatus corrects the state r of the $n^{th}$ time point. The output estimated at the $n^{th}$ time point may be expressed as, for example, $O_n=O_1+R_{initial}$. Also, the measurement may be expressed as, for example, $Z_n=O_1+R_{estimate}$.

To correct the state r of the $n^{th}$ time point, a difference between the measurement $Z_n$ and the output value $O_n$ is used. Here, $Z_n-O_n=R_{estimate}-R_{initial}$. Thus, the outputting apparatus corrects the state r using a value ($R_{estimate}-R_{initial}$). In this example, an output value $O_n'$ is determined based on the corrected state r.

Figure 5A:
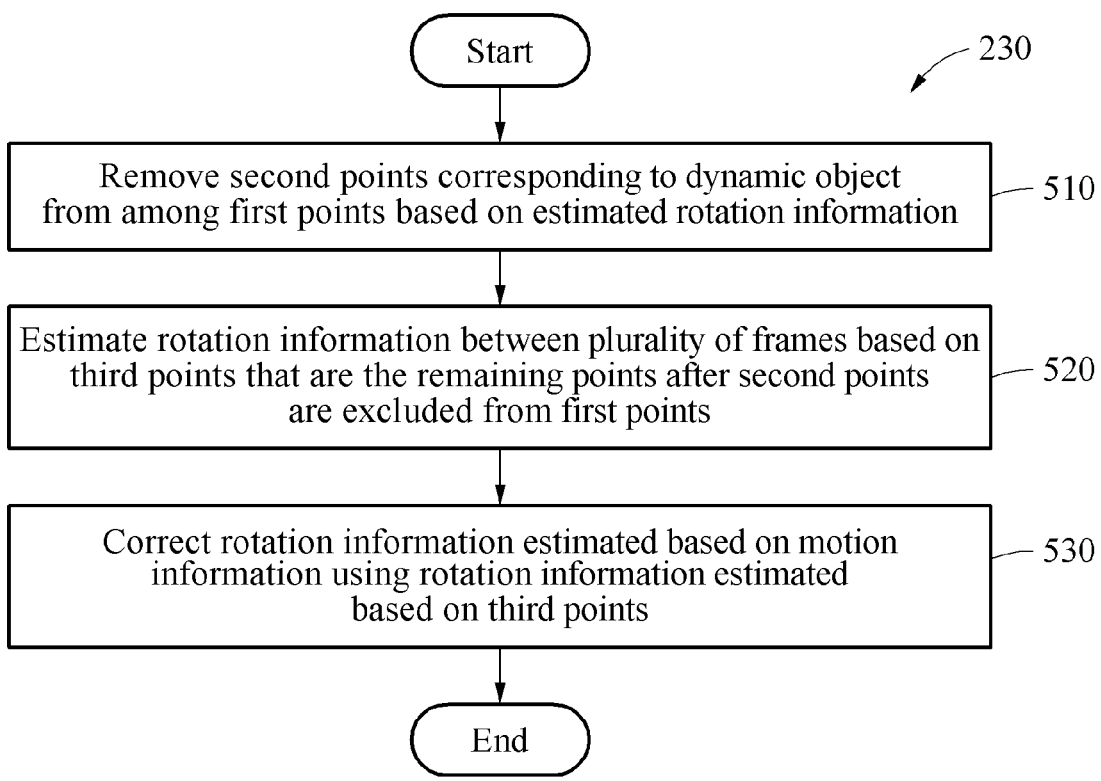
FIGS. 5A and 5B illustrate examples of a method of correcting estimated rotation information.

FIG. 5A is a diagram illustrating an example of a method of correcting estimated rotation information. The operations in FIG. 5A may be performed in the sequence and manner as shown, although the order of some operations may be changed or some of the operations omitted without departing from the spirit and scope of the illustrative examples described. Many of the operations shown in FIG. 5A may be performed in parallel or concurrently. One or more blocks of FIG. 5A, and combinations of the blocks, can be implemented by special purpose hardware-based computer that perform the specified functions, or combinations of special purpose hardware and computer instructions. In addition to the description of FIG. 4B below, the descriptions of FIG. 1-4B are also applicable to FIG. 4B, and are incorporated herein by reference. Thus, the above description may not be repeated here.

Referring to FIG. 5A, in operation 510, an outputting apparatus removes second points corresponding to a dynamic object from among first points based on estimated rotation information. The outputting apparatus estimates rotation information $R_{initial}$ obtained between a first time point and a second time point. The outputting apparatus removes the second points corresponding to the dynamic object from among the first points based on the rotation information $R_{initial}$.

In operation 520, the outputting apparatus estimates rotation information $R_{estimate}$ between a plurality of frames based on the third points. The third points being the remaining points when the second points are excluded from the first points. In an example, the outputting apparatus estimates the rotation information $R_{estimate}$ by applying a PNP function, a Gauss-Newton optimization function, and a Levenberg-Marquardt optimization function to the third points.

In operation 530, the outputting apparatus corrects the rotation information $R_{initial}$ that is estimated based on motion information using the rotation information $R_{estimate}$, which is estimated based on the third points. The outputting apparatus updates a state of an ego-motion corresponding to at least one of the plurality of frames based on a difference between the rotation information $R_{estimate}$ estimated based on the third points and the rotation information $R_{initial}$ estimated based on the motion information. The outputting apparatus estimates rotation information R* based on the updated state of the ego-motion.

Figure 5B:
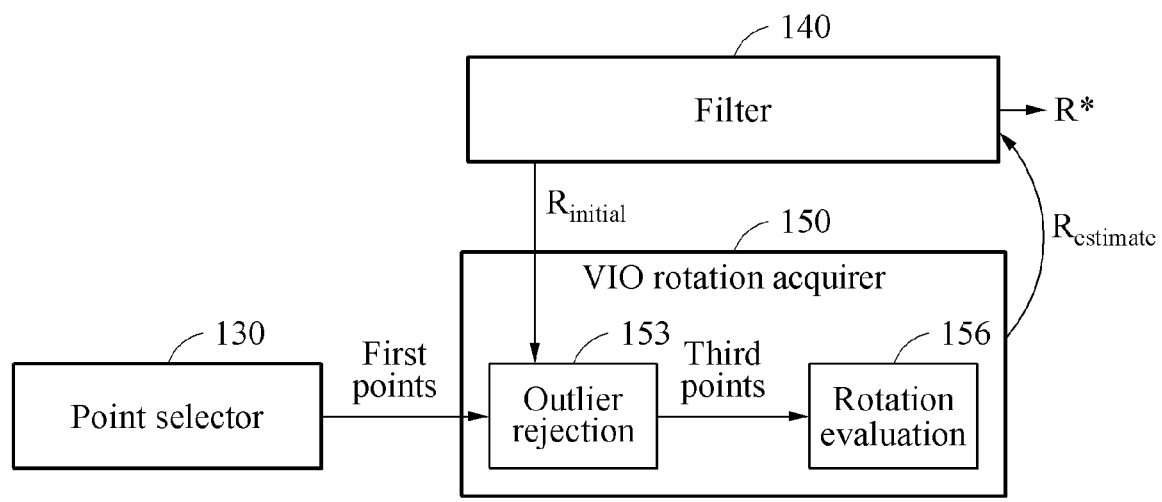

FIG. 5B is a diagram illustrating an example of a method of correcting estimated translation information. FIG. 5B illustrates operations of the point selector 130, the filter 140, and the VIO rotation acquirer 150 for correcting translation information.

In an example, the VIO rotation acquirer 150 receives first points from the point selector 130 and receives rotation information $R_{initial}$ from the filter 140. In an example, the VIO rotation acquirer 150 performs the outlier rejection 153 and the rotation evaluation 156 based on the first points and the rotation information $R_{initial}$.

In outlier rejection 153, the VIO rotation acquirer 150 rejects the outlier (the second points corresponding to the dynamic object) from the first points based on the rotation information $R_{initial}$ estimated based on the motion information received from the filter 140. Through the outlier rejection 153, third points are acquired by rejecting the outlier in the first points.

In an example, the VIO rotation acquirer 150 receives translation information $T_{initial}$ from the filter 140. In an example, the VIO rotation acquirer 150 obtains a matching relationship between points included in each of the plurality of frames based on the rotation information $R_{initial}$ and the translation information $T_{initial}$. The matching relationship is applied to the rotation evaluation 156.

In rotation evaluation 156, the VIO rotation acquirer 150 estimates the rotation information between the plurality of frames based on the third points transferred through the outlier rejection 153.

The VIO rotation acquirer 150 transmits the rotation information $R_{estimate}$ for correcting the rotation information $R_{initial}$ based on the third points to the filter 140. The VIO rotation acquirer 150 may evaluate the rotation information based on a difference between the rotation information $R_{estimate}$ estimated based on the third points and the rotation information $R_{initial}$ estimated based on the motion information, or an error between the two.

The VIO rotation acquirer 150 transfers the rotation information $R_{estimate}$ estimated based on the third points to the filter 140. The filter 140 corrects the rotation information $R_{initial}$ based on the rotation information $R_{estimate}$ and outputs rotation information R*.

Figure 6:
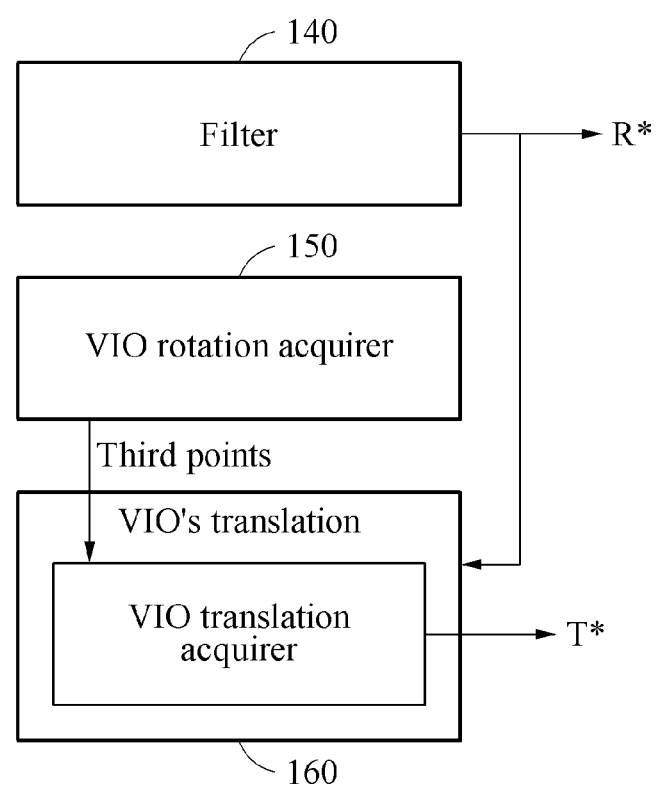
FIG. 6 illustrates an example of a method of calculating translation information between a plurality of frames.

FIG. 6 is a diagram illustrating an example of a method of calculating translation information between a plurality of frames. FIG. 6 illustrates operations of the filter 140, the VIO rotation acquirer 150, and the VIO translation acquirer 160 for calculating translation information.

The VIO translation acquirer 160 calculates translation information between a plurality of frames, for example a change amount of translation information. The VIO translation acquirer 160 calculates translation information T* between the plurality of frames based on third points received from the VIO rotation acquirer 150 and rotation information R* that is corrected in the filter 140.

In an example, the VIO translation acquirer 160 determines the translation information based on the rotation information R* such that an energy function associated with a difference in intensity between a plurality of frames to which the third points belongs is less than a target value. Here, the energy function may also be referred to as "photometric error function". In an example, the energy function is one of a Gauss-Newton optimization function and a Levenberg-Marquardt optimization function.

Figure 7:
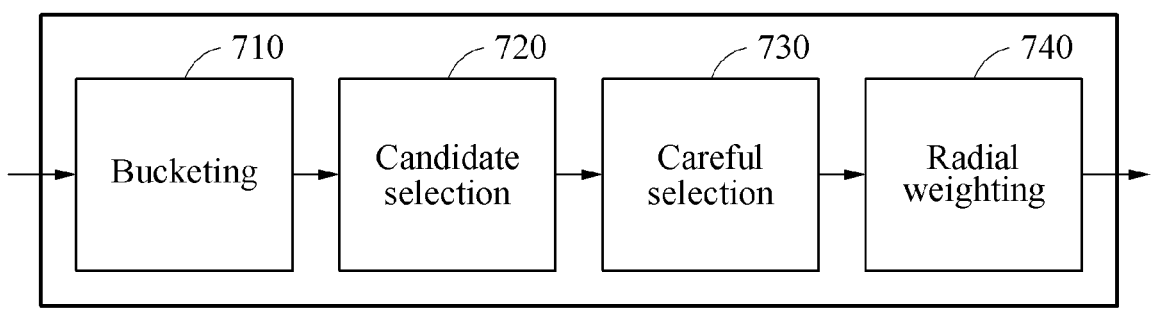
FIGS. 7 through 8D illustrate examples of a method of selecting a first point from a plurality of frames.

FIG. 7 is a diagram illustrating an example of selecting first points from a plurality of frames. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIG. 1-6 are also applicable to FIG. 7, and are incorporated herein by reference. Thus, the above description may not be repeated here.

Referring to FIG. 7, in an example, the point selector 130 selects first points using a bucketing method 710, a candidate selection method 720, a careful selection method 730, and a radial weighting method 740. Although the FIG. 7 describes that the point selector 130 selects the first points by performing four selection methods in sequence, the order of the sequence may be changed or only some of the selections methods may be used without departing from the spirit and scope of the illustrative examples described. Also, the above-mentioned four selection methods may be combined or separated according to an implementation.

In an example, the point selector 130 equally divides an area of a plurality of frames into blocks having a size and evenly selects points from each of the blocks based on the bucketing method 710. In an example, the point selector 130 selects points for each class such of a blob, an edge, and a corner based on the candidate selection method 720. In an example, the point selector 130 may allow the points to be evenly selected for each of the blocks and classes based on the careful selection method 730.

In an example, the point selector 130 selects points in consideration of an error occurring in restoring an image that is distorted due to a lens of a camera for capturing frames. Based on the radial weighting method 740, the point selector 130 assigns a higher weight to points at a center of the image among points evenly selected for each of the blocks or classes and assigns a lower weight at an outer edge, which is away from the center. Thus, a large number of points at the center of the image are selected.

Operations of the bucketing method 710, the candidate selection method 720, the careful selection method 730, and the radial weighting method 740 will be further described with reference to FIGS. 8A through 8D.

FIGS. 8A through 8D are diagrams illustrating examples of a method of selecting first points from a plurality of frames.

Figure 8A:
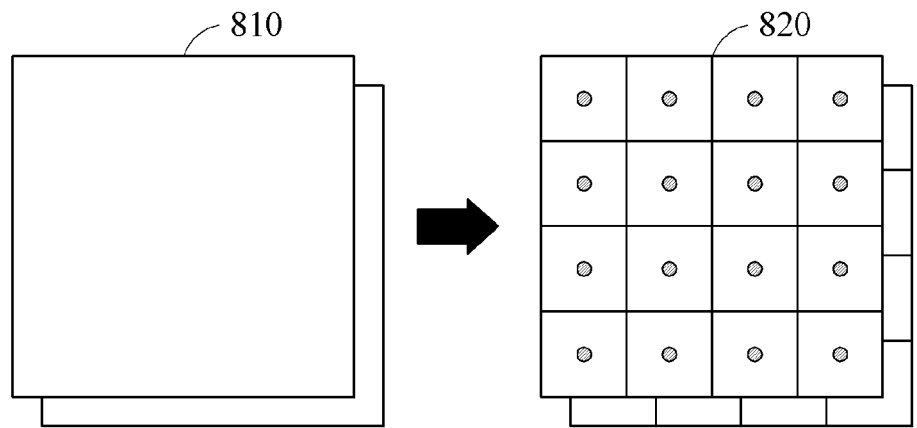

FIG. 8A illustrates a method of selecting first points based on a bucketing method. The bucketing method may be a method for improving a performance of a VIO by evenly selecting first points from each area of a plurality of frames 810. In an example, an outputting apparatus equally divides each of the plurality of frames 810 into blocks (or buckets) of a size, such as frames 820, for example. The outputting apparatus selects at least a number of first points from each of the equally divided blocks.

Figure 8B:
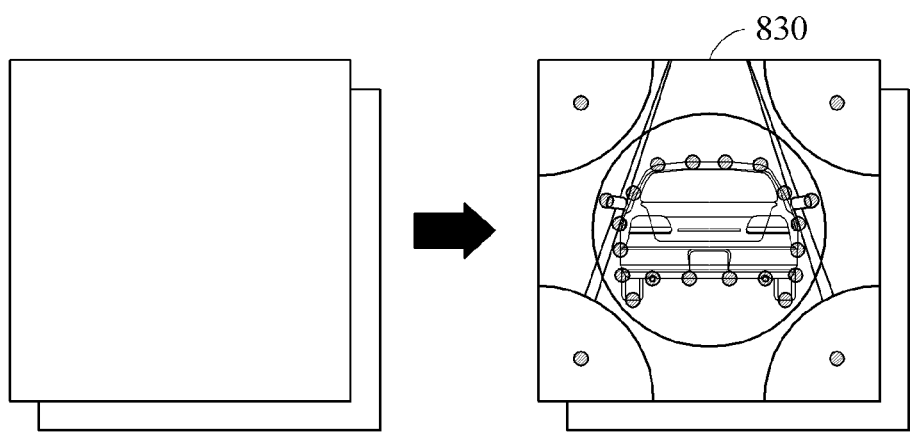

FIG. 8B illustrates a method of selecting first points using a candidate selection method. In an example, an outputting apparatus determines candidate points corresponding to a plurality of classes based on at least one of a magnitude and a direction of an intensity gradient of a pixel included in each of a plurality of frames and intensity relationships between pixels and pixels around the pixels. Here, the plurality of classes includes, for example, a corner, a blob, and an edge. In this example, the greater the magnitude of the intensity gradient of the pixel, the better the point. The outputting apparatus selects the first points from the candidate points included in each of the plurality of classes. The outputting apparatus selects first points from candidate points of various classes such as a plurality of frames 830 including a corner, a blob, and an edge based on, for example, a relationship between a direction of an intensity gradient of a corresponding pixel and an intensity of a pixel around the corresponding pixel.

Figure 8C:
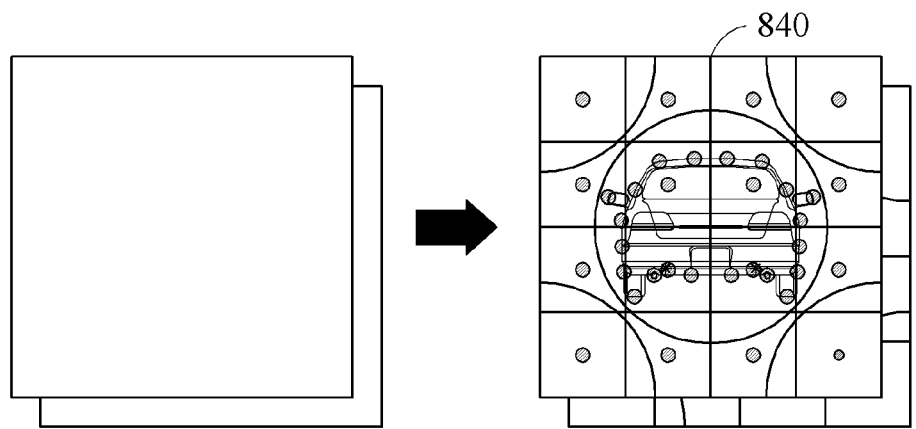

FIG. 8C illustrates a method of selecting first points using a careful selection method. The careful selection method is a method of once more selecting the candidate points selected through the candidate selection in the example of 8B to optimize a performance of a VIO.

An outputting apparatus selects first points from candidate points for each class included in a plurality of frames and for each block into which a plurality of frames is divided when classifying the first points. In this example, the outputting apparatus assigns a priority to a block having a relatively fewer number of selected points such that the first points are selected evenly in the entire area of frames and the entire classes. Also, the outputting apparatus preferentially selects points corresponding to relatively less selected classes in a corresponding block.

Figure 8D:
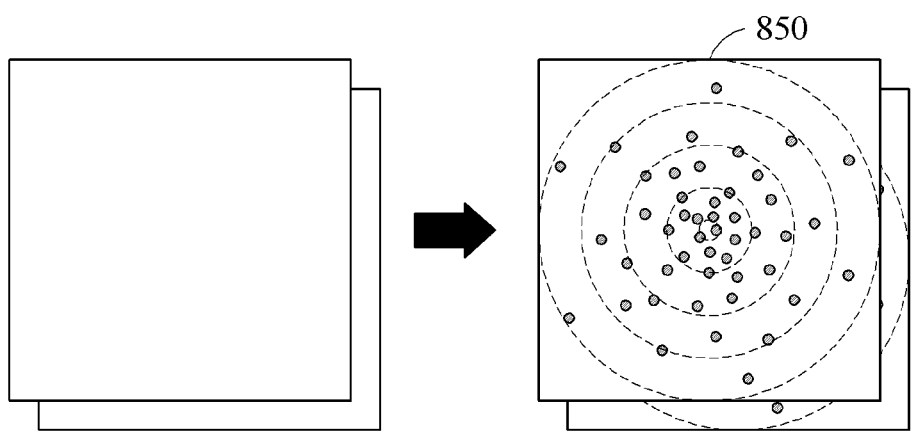

FIG. 8D illustrates a method of selecting first points using a radial weighting method. In general, it is used in a VIO through an undistortion process for removing a barrel distortion caused by a lens. Here, since the undistortion process is performed based on an approximation algorithm, an error may increase in a direction toward an edge of an image. Thus, a relatively small number of points may be used in a direction toward an edge of an image so as to improve a performance of the VIO.

The radial weighting method is a method of adjusting a number of first points selected through the aforementioned process so that a smaller number of points are selected as a location of the first points is farther from a center of an image.

An outputting apparatus assigns a first weight to points at a center of each of a plurality of frames 850. The outputting apparatus assigns a second weight that is less than the first weight to points gradually from the center toward an outer edge of each of the plurality of frames. For example, when the first weight is 0.8 or 0.9, the second weight may have a value less than 0.7. The outputting apparatus selects the first points from the points based on the first weight and the second weight. The outputting apparatus selects more points to which the higher first weight is assigned in comparison to points to which the second weight is assigned.

Figure 9:
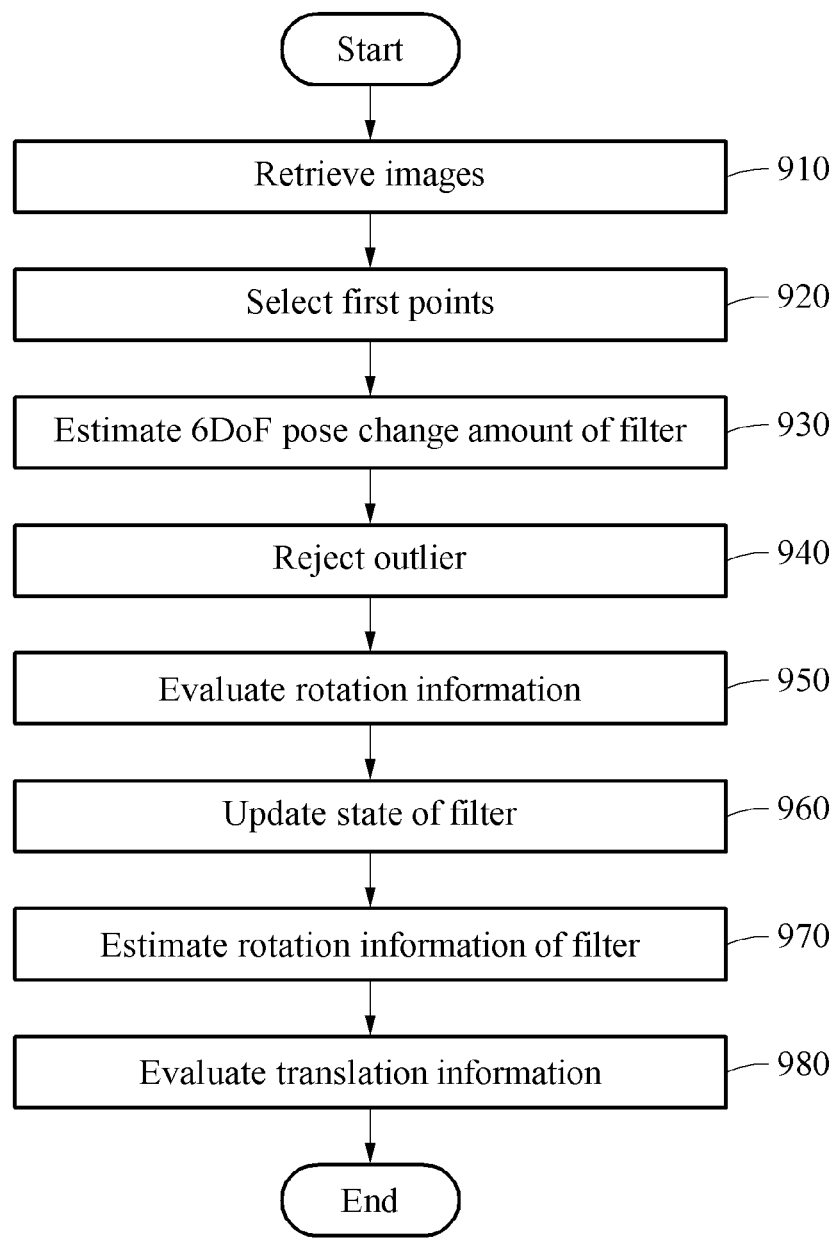
FIG. 9 illustrates an example of a method of outputting pose information.

FIG. 9 is a diagram illustrating an example of a method of outputting pose information. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer that perform the specified functions, or combinations of special purpose hardware and computer instructions. In addition to the description of FIG. 9 below, the descriptions of FIG. 1-8A are also applicable to FIG. 9, and are incorporated herein by reference. Thus, the above description may not be repeated here.

Referring to FIG. 9, in operation 910, an outputting apparatus retrieves images captured by a first sensor. For example, when a camera is a mono camera, the outputting apparatus acquires images corresponding to a single viewpoint. Also, when a camera is a stereo camera, the outputting apparatus acquires images corresponding to left and right viewpoints. In operation 920, the outputting apparatus selects first points from the images retrieved in operation 910.

In operation 930, the outputting apparatus estimates a 6DoF pose change amount of a filter based on motion information sensed by a second sensor. In operation 940, the outputting apparatus removes second points corresponding to a dynamic object from among the first points based on the change of the 6DoF pose amount estimated in operation 930.

In operation 950, the outputting apparatus evaluates rotation information of current frames based on third points. The third points are the points remaining after the second points are excluded from the first points, for example, an inlier, thereby calculating rotation information. In operation 960, the outputting apparatus updates a state of the filter based on the rotation information calculated in operation 950. Here, the state of the filter corresponds to a state of an ego-motion corresponding to the current frames.

In operation 970, the outputting apparatus estimates rotation information of the filter using a value of the state updated in operation 960. In operation 980, the outputting apparatus evaluates (or estimates) translation information of a visual odometry based on the rotation information of the filter. In an example, the outputting apparatus estimates the translation information based on rotation information previously estimated for the inlier points.

FIG. 10 is a diagram illustrating an example of an apparatus for outputting pose information. Referring to FIG. 10, an outputting apparatus 1000 includes sensors 1010 including a first sensor 1013 and a second sensor 1016, and a processor 1030. The outputting apparatus 1000 further includes a memory 1050, a communication interface 1070, and a display 1090. The sensors 1010, the processor 1030, the memory 1050, the communication interface 1070, and the display 1090 communicate with one another through a communication bus 1005.

The first sensor 1013 is, for example, an image sensor or a vision sensor. The first sensor 1013 captures a plurality of frames corresponding to a driving image of a vehicle. The second sensor 1016 senses motion information. The second sensor 1016 includes sensors such as, for example, an acceleration sensor, a gyro sensor, a GPS sensor, an IMU sensor, a radar, and a lidar. The second sensor 1016 senses sensing information of, for example, a speed, an acceleration, an angular velocity, a driving direction, a vehicle steering wheel angle, and a vehicle speed in addition to positioning information such as GPS coordinates, a position, and a pose.

The processor 1030 performs the operations described with reference to FIGS. 1 through 9.

The memory 1050 stores the plurality of frames captured by the first sensor 1013 and/or the motion information sensed by the second sensor 1016. Also, the memory 1050 stores rotation information estimated by the processor 1030, corrected rotation information, and translation information. The memory 1050 stores various information generated during a processing operation of the processor 1030. Also, the memory 1050 stores a variety of data and programs. The memory 1050 includes a volatile memory or a non-volatile memory. The memory 1050 includes a large-capacity storage medium such as a hard disk to store the variety of data. Further details of the memory 1050 is provided below.

The outputting apparatus 1000 acquires sensing information of various sensors including the motion information and/or the plurality of frames through the communication interface 1070. Depending on an example, the communication interface 1070 receives sensing information from other sensors located outside the outputting apparatus 1000.

The processor 1030 outputs corrected rotation information and/or translation information using the communication interface 1070 or displays a virtual object on the display 1090 based on the corrected rotation information and/or translation information, thereby providing an augmented reality service. The processor 1030 may render the virtual object on the display 1090 based on the corrected rotation information and/or translation information and may also represent the virtual object together with the captured frames.

The term "processor," as used herein, is a hardware-implemented data processing device having a circuit that is physically structured to execute desired operations. For example, the desired operations include code or instructions included in a program. The hardware-implemented data processing device includes, but is not limited to, for example, a microprocessor, a central processing unit (CPU), a processor core, a multi-core processor, a multiprocessor, an application-specific integrated circuit (ASIC), and a field-programmable gate array (FPGA).

The processor 1030 executes a program and controls the outputting apparatus 1000. Codes of the program executed by the processor 1030 are stored in the memory 1050. Further details of the processor 1030 is provided below.

The display 1090 displays the corrected rotation information and/or translation information of the vehicle determined by the processor 1030. The display 1090 displays a virtual object on the display 1090 based on the corrected rotation information and/or translation information of the vehicle. In an example, the display 1090 is a physical structure that includes one or more hardware components that provide the ability to render a user interface and/or receive user input. In an example, the corrected position of the vehicle is displayed on a wind shield glass or a separate screen of the vehicle using a head-up display (HUD) device or is displayed on an augmented reality head-up display (ΔR HUD). In an example, the outputting apparatus 1000 transmits the localization information to an electronic control unit (ECU) or a vehicle control unit (VCU) of a vehicle. The ECU or the VCU displays the localization information on display device 1350 of the vehicle.

However, the displaying of the corrected position of the vehicle is not limited to the example described above, and any other instrument cluster, vehicular infotainment system, screen in the vehicle, or display panel in the vehicle may perform the display function. Other displays, such as, for example, smart phone and eye glass display (EGD) that are operatively connected to the outputting apparatus 1000 may be used without departing from the spirit and scope of the illustrative examples described.

The outputting apparatus 1000 is an apparatus for performing the aforementioned method of outputting the pose information and may be, for example, a vehicle and a user device such as a navigation and a smartphone.

The outputting apparatus 100, outputting apparatus 1000, filter 140, point selector 130, rotation information acquirer, VIO rotation acquirer 150, translation information acquirer, VIO translation acquirer 160, apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of obtaining pose information. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of obtaining pose information, the method comprising:
   selecting first points from frames captured by a first sensor;
   estimating initial rotation information between the frames by:
      estimating a current state of an ego-motion, using a filter, based on a previous state of the ego-motion and motion information sensed by a second sensor; and
      calculating the initial rotation information as an amount of rotation change between a first output of the filter at the previous state and a second output of the filter at the current state;
   generating corrected rotation information by,
      prior to translation information between the frames being obtained, obtaining third points as a result of excluding, from the first points, based on the estimated initial rotation information, second points corresponding to a dynamic object;
      estimating additional rotation information between the frames based on the third points;
      estimating a corrected current state of the ego-motion, using the filter, based on the current state of the ego-motion and the additional rotation information; and
      calculating the corrected rotation information as an amount of rotation change between the first output of the filter at the previous state and a third output of the filter at the corrected current state;
   obtaining the translation information between the frames based on the third points and the corrected rotation information; and
   outputting the corrected rotation information and the translation information.

2. The method of claim 1, wherein the estimating of the initial rotation information comprises:
   estimating the initial rotation information of the frames using one of a Kalman filter, an extended Kalman filter, an iterated extended Kalman filter, an unscented Kalman filter, or a particle filter.

3. The method of claim 1, wherein the second points are identified based on the estimated initial rotation information.

4. The method of claim 1, wherein the generating of the corrected rotation information further comprises:
   correcting the estimated initial rotation information by using the estimated additional rotation information.

5. The method of claim 4, wherein the correcting of the estimated initial rotation information comprises:
   updating a state of an ego-motion corresponding to any one or any combination of the frames based on a difference between the estimated additional rotation information and the estimated initial rotation information.

6. The method of claim 1, wherein the frames comprise a first frame captured at a first time and a second frame captured at a second time, and
   wherein ere the removing of the second points comprises:
      calculating a rotation change amount between first rotation information estimated at the first time and second rotation information estimated at the second time; and
      removing the second points based on the rotation change amount.

7. The method of claim 1, wherein the estimating of the additional rotation information comprises:
estimating the additional rotation information by applying one of a Perspective-n-Point (PNP) function, a Gauss-Newton optimization function, or a Levenberg-Marquardt optimization function to the third points.

8. The method of claim 1, wherein the obtaining of the translation information comprises:
determining the translation information based on the corrected rotation information such that an energy function associated with a difference in intensity between frames to which the third points belong is less than a threshold.

9. The method of claim 8, wherein the energy function comprises one of a Gauss-Newton optimization function or a Levenberg-Marquardt optimization function.

10. The method of claim 1, wherein the selecting of the first points comprises either one or both of:
selecting the first points for each block into which the frames are divided and;
selecting the first points for each class, among classes, in the frames.

11. The method of claim 10, wherein the selecting the first points for each block comprises:
equally dividing each of the frames into blocks; and
selecting the first points from each of the equally divided blocks.

12. The method of claim 10, wherein the selecting of the first points for each class comprises:
determining candidate points corresponding to the classes based on any one or any combination of any two or more of degrees of intensity gradients of pixels in each of the frames, directions of the intensity gradients of the pixels, and intensity relationships between the pixels and adjacent pixels; and
selecting the first points from the candidate points in the each of the classes.

13. The method of claim 1, wherein the selecting of the first points comprises:
assigning a first weight to points a, among a plurality of points, at a center of each of the frames;
assigning a second weight to points, among the plurality of points, away from the center and toward an outer edge of each of the frames; and
selecting the first points from the plurality of points based on the first weight and the second weight.

14. A non-transitory computer-readable storage medium storing instructions that, when executed by a processor, cause the processor to perform the method of claim 1.

15. An apparatus for outputting pose information, the apparatus comprising:
a first sensor configured to capture frames;
a second sensor configured to sense motion information; and
a processor configured to:
estimate initial rotation information between the frames by:
estimating a current state of an ego-motion, using a filter, based on a previous state of the ego-motion and motion information sensed by the second sensor; and
calculating the initial rotation information as an amount of rotation change between a first output of the filter at the previous state and a second output of the filter at the current state;
generating corrected rotation information by,
prior to translation information between the frames being obtained, obtaining third points as a result of excluding, from the first points, based on the estimated initial rotation information, second points corresponding to a dynamic object; and
estimating additional rotation information between the frames based on the third points;
estimating a corrected current state of the ego-motion, using the filter, based on the current state of the ego-motion and the additional rotation information; and
calculating the corrected rotation information as an amount of rotation change between the first output of the filter at the previous state and a third output of the filter at the corrected current state; and
obtaining the translation information between the frames based on the third points and the corrected rotation information.

16. The apparatus of claim 15, wherein the generating of the corrected rotation information comprises:
correcting the estimated initial rotation information by using the estimated additional rotation information.

17. The apparatus of claim 15, wherein the processor is further configured to determine the translation information based on the corrected rotation information such that an energy function associated with a difference in intensity between a frames to which the third points belong is less than a threshold.

18. The apparatus of claim 15, wherein each of the frames comprises an image of a front view from a vehicle.

19. A pose detection apparatus comprising:
a first sensor configured to capture image frames;
a second sensor configured to sense motion information;
a head-up display (HUD); and
a processor configured to:
select first points from the image frames;
estimate initial rotation information between the image frames by
estimating a current state of an ego-motion, using a filter, based on a previous state of the ego-motion and motion information, and
calculating the initial rotation information as an amount of rotation change between a first output of the filter at the previous state and a second output of the filter at the current state;
generating corrected rotation information by,
prior to translation information between the image frames being obtained, obtaining third points as a result of excluding, from the first points, based on the estimated initial rotation information, second points corresponding to a dynamic object,
estimating additional rotation information based on the third points,
estimating a corrected current state of the ego-motion, using the filter, based on the current state of the ego-motion and the additional rotation information, and
calculating the corrected rotation information as an amount of rotation change between the first output of the filter at the previous state and a third output of the filter at the corrected current state;
obtain the translation information between the image frames based on the third points and the corrected rotation information; and
render a virtual object on the HUD based on the corrected rotation information and the translation information.

20. The device of claim 19, further comprising a memory storing the image frames, the motion information, the estimated initial rotation information, the corrected rotation information, the translation information, and instructions that, when executed, configure the processor to determine either one or both of the corrected rotation information and the translation information.

\* \* \* \* \*